US009816454B1

(12) United States Patent
Anderson et al.

(10) Patent No.: US 9,816,454 B1
(45) Date of Patent: Nov. 14, 2017

(54) SYSTEM AND METHOD FOR CONTROLLING AN ENGINE BASED ON PISTON TEMPERATURE DEVIATION

(71) Applicant: GM GLOBAL TECHNOLOGY OPERATIONS LLC, Detroit, MI (US)

(72) Inventors: Jeremy J. Anderson, Royal Oak, MI (US); Jonathan T. Shibata, Whitmore Lake, MI (US); Sharon X. Li, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 15/198,871

(22) Filed: Jun. 30, 2016

(51) Int. Cl.
*F02D 35/02* (2006.01)
*F02D 41/30* (2006.01)
*F02D 41/24* (2006.01)

(52) U.S. Cl.
CPC ....... *F02D 41/3005* (2013.01); *F02D 35/026* (2013.01); *F02D 41/2416* (2013.01); *F02D 2200/022* (2013.01)

(58) Field of Classification Search
CPC ............ F02D 41/3005; F02D 41/2416; F02D 35/026; F02D 2200/022; G01M 15/048
USPC ........................ 123/435; 73/114.18; 701/111
See application file for complete search history.

(56) References Cited

U.S. PATENT DOCUMENTS

| 7,900,601 | B2 | 3/2011 | Gwidt et al. |
| 8,989,989 | B2 | 3/2015 | Scomak et al. |
| 9,316,150 | B2 * | 4/2016 | Cleeves ................. F02B 75/04 |
| 2017/0159584 | A1 * | 6/2017 | Yamashita .......... F02D 41/0002 |

* cited by examiner

*Primary Examiner* — Hai Huynh (57) ABSTRACT

A system for controlling an engine based on piston temperature deviation includes a piston temperature estimation module that estimates a piston temperature based on engine operating conditions, a piston temperature deviation estimation module that estimates a deviation of the estimated piston temperature from a steady-state piston temperature, and an engine control module that determines an engine control parameter based upon the estimated piston temperature deviation.

20 Claims, 5 Drawing Sheets

SYSTEM AND METHOD FOR CONTROLLING AN ENGINE BASED ON PISTON TEMPERATURE DEVIATION

FIELD

The present disclosure relates to a system and method for controlling an engine based on piston temperature deviation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle valve, which adjusts a throttle area to control air flow into the engine. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Exhaust gas passing through an exhaust system may include particulate matter. Exhaust components, such as particulate filters, have been developed to filter the particulate matter. These components, however, increase the cost and mass of a vehicle.

A system described in U.S. Pat. No. 8,989,989 (hereinafter "the '989 patent"), the description of which is incorporated herein in its entirety, describes a system that includes a temperature estimation module and a fuel control module. The temperature estimation module estimates a piston temperature associated with a cylinder based on engine operating conditions. The fuel control module controls an injection timing associated with the cylinder, an injection pressure associated with a cylinder, an injection location associated with a cylinder, or a number of injections per engine cycle associated with the cylinder based on the estimated piston temperature.

SUMMARY

While it has generally been understood that actual piston temperatures fluctuate during normal engine operations, conventional systems only very crudely adjust for these fluctuations. During development significant effort is dedicated to calibrating an engine control system for each engine family. As part of the calibration process, the actual piston temperatures may be sensed and the control parameters for the engine may be optimized to produce a desired result, for example, to reduce particulate emissions. The engine is operated until conditions are stabilized such that they reach a substantially "steady-state" condition. The engine operating parameters for each desired steady-state condition may then be stored and referenced for use in production engines. In these production engines, the piston temperatures may be inferred or estimated based upon the engine operating parameters and the engine may then be controlled to produce a desired result. The invention described in the '989 patent takes advantage of this calibration process to adjust engine operating parameters. While this substantially reduces particulate emissions, the system disclosed by the '989 patent only crudely responds to piston temperatures by adjusting engine parameters in binary manner. The piston temperature is estimated and filtered and then compared to a threshold value. The engine parameters are only adjusted in response to the simple trigger which is invoked by exceeding this threshold. The inventors of the present invention realized that additional significant benefits could be obtained by further refinement and continuously adjusting engine parameters. In this manner, significant reduction in particulates and many other benefits can be achieved.

An exemplary embodiment of the present invention adjusts engine control signals based upon, not only the steady state piston temperatures, but further modifies the engine control parameters by interpolating between values in a "first" look up table that would otherwise have resulted from a steady-state condition (as is done by the '989 patent) and values in a newly created "second" look up table. The values of the "second" look up table are derived during calibration but are filled with values that are derived when the piston temperature is at a known value which differs from the steady state piston temperature. For example, the piston temperature of a calibration engine may be maintained at a temperature that differs from what the previously derived steady-state piston temperatures would otherwise have been while the engine operating conditions are recorded and the engine operating parameters are optimized to, for example, provide for reduced particulate emissions. An exemplary embodiment of the present invention then calculates a piston temperature deviation which enables an interpolation between the values of these two tables to provide much improved, continuously optimized results. In this manner, significant reduction in particulate emissions and other benefits and advantages may be achieved which had previously not been possible.

In one exemplary embodiment of the present invention, the system includes a temperature estimation module that estimates a piston temperature based on engine operating conditions, a piston temperature deviation estimation module that estimates a deviation from the estimated steady-state piston temperature based upon engine operating conditions, and an engine controller that interpolates between values of "first" and "second" look up tables to output control signals to the engine.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

When fuel contacts a cold piston, the fuel forms puddles on the piston, wherein the fuel is unable to evaporate and mix thoroughly with the engine charge air. Combustion of liquid fuel produces locally fuel-rich combustion zones that result in the formation of undesirable particulate emissions. Thus, the amount of particulates produced by an engine may be greater when pistons in the engine are cold as compared to when the pistons are at a typical operating temperature. The pistons may be cold after fuel injection in the engine is stopped. For example, fuel injection may be stopped when the engine is decelerating to improve fuel economy.

An engine control system and method according to an exemplary embodiment of the present invention adjusts an engine control parameter based on a piston temperature deviation from an estimated steady state piston temperature. For example, fuel injection parameters may be adjusted based on piston temperature deviation including injection timing, injection pressure, injection location, and/or a number of injections per engine cycle. Injection timing may be retarded, injection pressure may be adjusted, injection location may be adjusted and/or multiple injections per engine cycle may be commanded based upon an estimated piston temperature deviation from an estimated steady state piston temperature. The steady state piston temperature and the piston temperature deviation are estimated based on engine operating conditions such as engine speed, engine load, intake air temperature, engine coolant temperature, air/fuel ratio, spark timing and the like. The relationship between the piston temperature and the engine operating conditions may be developed under steady-state conditions (e.g., constant speed), and the piston temperature may be filtered using a lag filter. An adjustment to engine control parameters may then be performed by interpolating between a conventionally derived "first" engine control parameter table and a new "second" engine control parameter table to arrive at an engine control parameter that provides significant additional benefits.

For example, further adjusting fuel injection based upon a piston temperature deviation may reduce fuel puddles form forming on piston surfaces. Preventing fuel puddles from forming on piston surfaces in an engine may reduce the amount of particulate matter produced by the engine. Preventing fuel puddles from forming on piston surfaces may also prevent other negative effects such as oil dilution.

Figure 1:
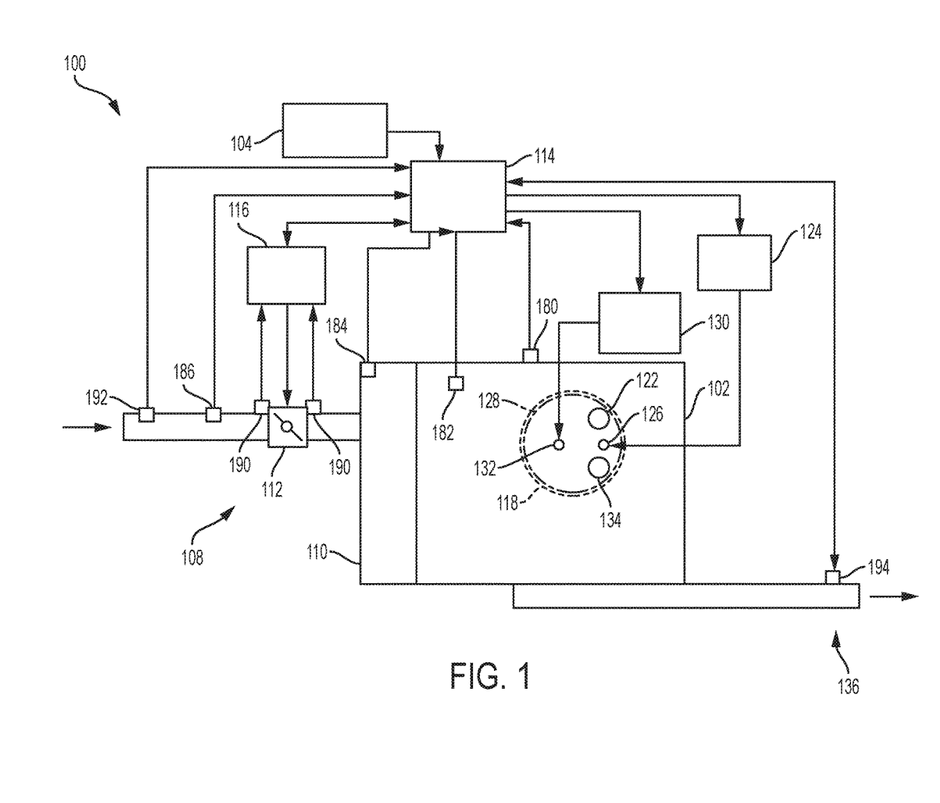
FIG. 1 is a functional block diagram of an engine system according to an exemplary embodiment of the present invention.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The driver input may include, for example, an accelerator pedal position and/or a cruise control setting. The cruise control setting may be received from a cruise control system, which may be an adaptive cruise control system that varies vehicle speed to maintain a predetermined following distance.

Air is drawn into the engine 102 through an intake system 108. The intake system 108 includes an intake manifold 110 and a throttle valve 112, which may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes are the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 126 to achieve a desired air/fuel ratio. As presently shown, the fuel injector 126 injects fuel directly into the cylinders. Additionally or alternatively, fuel may be injected into mixing chambers associated with the cylinders. Additionally, fuel may be injected into the intake manifold 110 at a central location or at multiple locations, such as near the intake valve 122 of each of the cylinders. The fuel actuator module 124 may halt injection of fuel to cylinders that are deactivated.

During the compression stroke, a piston 128 within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine (e.g., a spark ignition direct injection (SIDI) engine), in which case a spark actuator module 130 energizes a spark plug 132 in the cylinder 118 based on a signal from the ECM 114, which ignites the air/fuel mixture. The timing of the spark may be specified relative to the time when the piston is at its topmost position, referred to as top dead center (TDC).

The spark actuator module 130 may be controlled by a timing signal specifying how far before or after TDC to generate the spark. Because piston position is directly related to crankshaft rotation, operation of the spark actuator module 130 may be synchronized with crankshaft angle. In various implementations, the spark actuator module 130 may halt provision of spark to deactivated cylinders.

Generating the spark may be referred to as a firing event. The spark actuator module 130 may have the ability to vary the timing of the spark for each firing event. The spark actuator module 130 may even be capable of varying the spark timing for a next firing event when the spark timing signal is changed between a last firing event and the next firing event. In various implementations, the engine 102 may include multiple cylinders and the spark actuator module 130 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 134. The byproducts of combustion are exhausted from the vehicle via an exhaust system 136.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 is measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 is measured using a mass air flow (MAF) sensor 186. In various implementations, the MAF sensor 186 may be located in a housing that also includes the throttle valve 112.

The throttle actuator module 116 monitors the position of the throttle valve 112 using one or more throttle position sensors (TPS) 190. The ambient temperature of air being drawn into the engine 102 is measured using an intake air temperature (IAT) sensor 192. The air/fuel ratio of exhaust gas output by the engine 102 is measured using an air/fuel ratio (AFR) sensor 194. The ECM 114 uses signals from the sensors to make control decisions for the engine system 100. For example, the ECM 114 estimates a steady state piston temperature and a piston temperature deviation from that steady state temperature and then adjusts, for example, injection timing, injection pressure, injection location, and/or a number of injections per engine cycle based on the piston temperature.

Figure 2A:
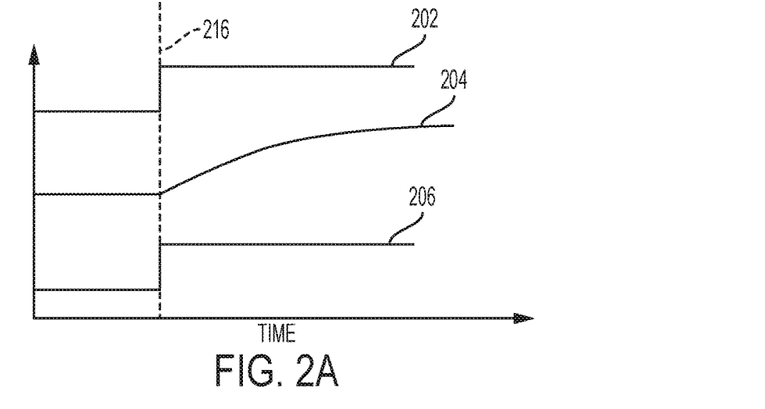
FIG. 2A is a graph illustrating an exemplary engine control parameter adjustment in response to a change in an engine operating condition in accordance with a conventional system and method.
Figure 2B:
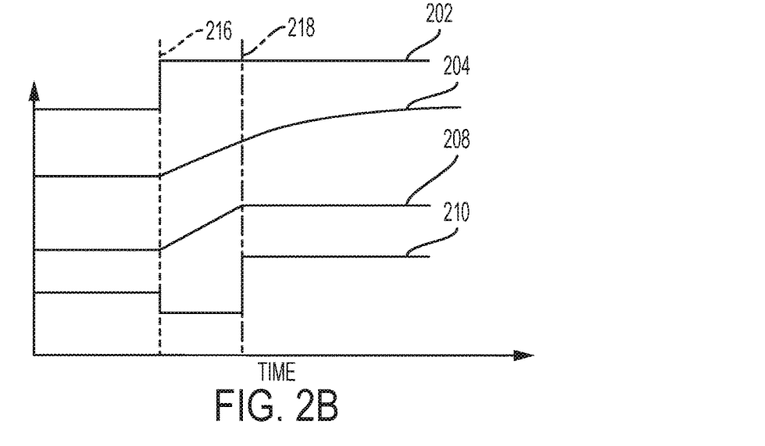
FIG. 2B is a graph illustrating an exemplary engine control parameter adjustment in response to a change in an engine operating condition based upon an estimated piston temperature in accordance with another conventional system and method.
Figure 2C:
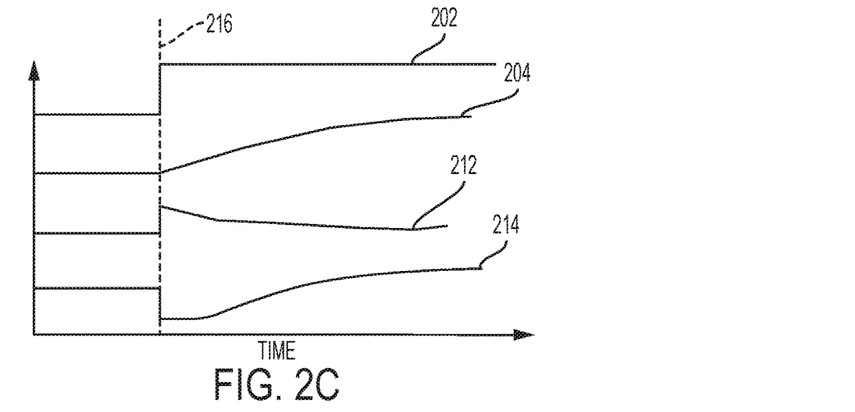
FIG. 2C is a graph illustrating an exemplary engine control parameter adjustment in response to a change in an engine operating condition based upon an estimated piston temperature deviation in accordance with an exemplary embodiment of the present invention.

Referring now to FIGS. 2A-2C, a comparison between engine parameter control systems and methods is illustrated. FIG. 2A is a graph illustrating an approximation of the actual piston temperature 204 in response to a change in engine load 202 over time. The engine load line 202 and the actual piston temperature line 204 are identical across all FIGS. 2A-2C. The engine load line 202 experiences a step load change at time 216. In response, it is understood that the actual piston temperature will gradually move toward another "steady-state" temperature in response to the conditions experienced in reaction to the step change in load. Only the responses to those conditions by the different system vary across these figures to illustrate their differences. The exemplary system response of FIG. 2A illustrates a step response in an engine control parameter 206 in response to the step change in engine load 202. For example, a fuel controller may step-wise adjust the start of injection of fuel into the cylinder based upon steady-state piston temperatures that may eventually be achieved after a period of time has elapsed after the step change in load 202 at time 216. Since the actual piston temperature 204 does not change in a step-wise fashion, the piston temperatures are clearly not at the steady-state temperature immediately. Rather, the actual piston temperature 204 takes some time to react and only moves in a direction toward the steady-state temperature. Thus, for example, the piston may be colder than the steady-state temperature and fuel may puddle and cause particulate emissions to rise.

FIG. 2B illustrates an improvement over the system illustrated by FIG. 2A. FIG. 2B illustrates an approximation of the response of the system and method described by the '929 patent. In that system, an approximation of the filtered/estimated piston temperature calculated as illustrated in response line 208. Based upon the filtered/estimated piston temperature, that system compares the filtered temperature against a threshold and when that temperature exceeds this threshold that system step-wise adjusts an engine control parameter to that which corresponds to the steady-state piston temperature corresponding to the new load. An approximation of that adjusted engine control parameter is illustrated by line 210. For example, a start of fuel injection may initially be retarded by a step amount at time 216 until the filtered/estimated piston temperature exceeds a threshold at 218, at which time the engine control parameter is step-wise adjusted. In this manner, for example, the engine parameter may be stepwise changed twice to improve the output from the controlled engine. While this system results in improvements over the system response illustrated in FIG. 2A, it is clear that the response only very crudely responds to the load change in a manner which better approximates actual conditions.

FIG. 2C illustrates an engine control parameter adjustment in accordance with an exemplary embodiment of the present invention. The graph 2C illustrates the load step initiation at 216 in the demanded load 202 and an approximation of the actual piston temperature at 204 as is also illustrated in FIGS. 2A and 2B. As explained above, the estimated piston deviation may rely upon a filtered/estimated piston temperature (which in this case may be approximated in line 208 FIG. 2B). In stark contrast to the response above, an exemplary system in accordance with the present invention determines a piston temperature deviation which is illustrated by line 212 in FIG. 2C. This system then uses this piston temperature deviation 212 in order to interpolate between a first engine parameter table and a second engine parameter table to provide a continuously, better optimized engine parameter control signal 214 which results in significantly improved engine response. In this manner, for example, particulate output from the engine may be reduced.

Figure 3:
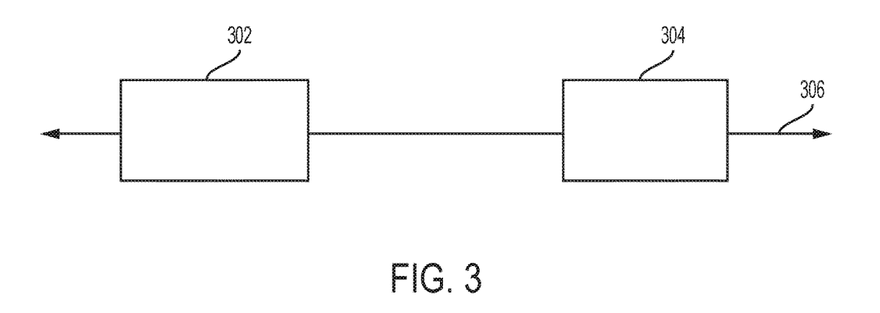
FIG. 3 is a functional block diagram illustrating an interpolation between values based upon a piston temperature deviation in accordance with an exemplary embodiment of the invention.

FIG. 3 schematically illustrates an interpolation method 300 between values in a "first" look up table 302 and a "second" look up table 304. The first look up table 302 is similar to that which is used by the system that is disclosed by the '989 patent. This first look up table 302 is calibrated or derived by optimizing engine control parameters after the engine achieves a steady state condition at recorded engine operating conditions. As explained in the '989 patent, an estimated and filtered piston temperature is used in accordance with the engine operating conditions to output an engine control parameter using this first look up table 302. A new, second look-up table 304 may be created that provides engine control parameter values that are optimized from engine operating conditions in which the piston temperature differs from that of table 302. Knowledge of the difference between these two temperatures enables an interpolation along a continuum of values which intersect the values in tables 302 and 304. A piston temperature deviation is calculated which lies on a continuum of values between an estimated/filtered piston temperature and the steady-state piston temperature (the piston temperature that is only achieved when engine operating conditions are held at the new load for a period of time as is done during calibration). This piston temperature deviation determines a location along the continuum 306 with which values from the first and second tables 302 and 304 may be used to derive a continuously adjusted and better optimized engine control parameter.

Figure 4:
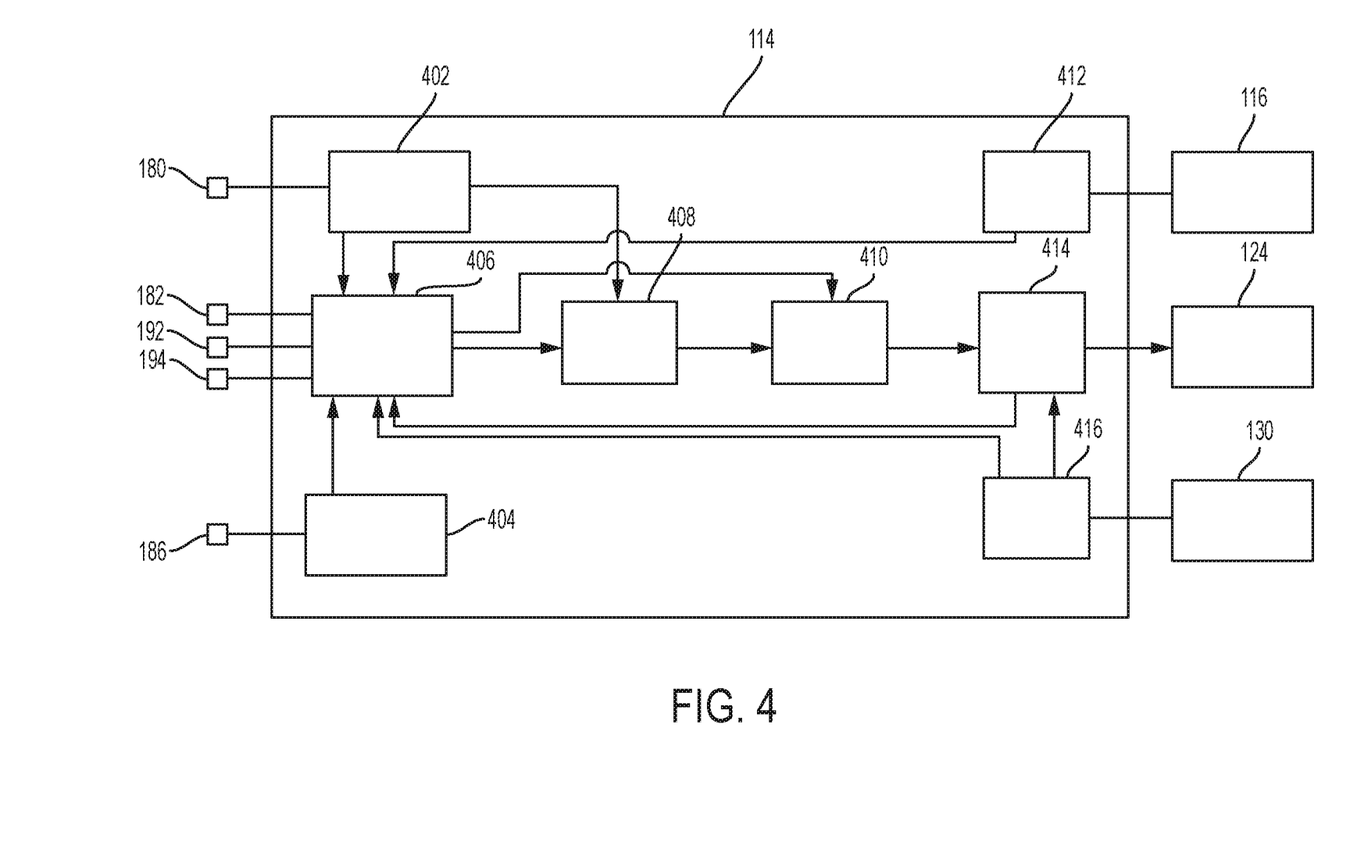
FIG. 4 is a functional block diagram of an engine control system according to an exemplary embodiment of the present invention.

Referring now to FIG. 4, an example implementation of the ECM 114 includes a speed determination module 402, a load determination module 404, a temperature estimation module 406, and a temperature filter module 408. The speed determination module 402 determines the engine speed based on input from the CKP sensor 180. For example, the speed determination module 402 may calculate the engine speed based on a period that elapses as the crankshaft completes one or more revolutions. The speed determination module 402 outputs the engine speed.

The load determination module 404 determines the engine load based on input from the MAF sensor 186. The load determination module 404 may determine an amount of airflow per cylinder based on the mass flow rate of air and the number of cylinders in the engine 102. The engine load may be directly proportional to the amount of airflow per cylinder. The load determination module 404 outputs the engine load.

The temperature estimation module 406 estimates a steady state piston temperature based on engine operating parameters. The engine operating parameters may include, for example, the engine speed, the engine load, the intake air temperature, the engine coolant temperature, an air/fuel ratio, and/or spark timing. The air/fuel ratio and/or the spark timing may be associated with all of the cylinders in the engine 102 and/or the single cylinder with which the piston temperature is associated.

The temperature estimation module 406 may receive the air/fuel ratio from the AFR sensor 194. Additionally or alternatively, the temperature estimation module 406 may determine the air/fuel ratio based on input received from a throttle control module 412 and a fuel control module 414. The input received may include a desired throttle area and a desired pulse width. The temperature estimation module 406 determines the spark timing based on input received from a spark control module 418. The input received may include a desired spark timing.

The temperature estimation module 406 may estimate the steady state piston temperature based on the engine operating conditions using a predetermined relationship. The predetermined relationship may be embodied in a mathematical model and/or a lookup table. The predetermined relationship may apply weight factors to the engine operating conditions. The weight factors applied to some of the engine operating conditions (e.g., engine speed, engine load, air/fuel ratio) may be greater than the weight factors applied to the other engine operating conditions (e.g., intake air temperature, spark timing).

The predetermined relationship may be developed when the engine 102 is operating in steady-state conditions. Thus, the temperature estimation module 406 only generates a "steady-state" piston temperature. The engine 102 may operate in steady-state conditions when the engine 102 is warm (e.g., at an operating temperature) and/or is operating at a relatively constant speed. The piston temperature that is estimated using the predetermined relationship may be referred to as a steady-state temperature. The temperature estimation module 406 outputs the steady-state piston temperature.

The temperature filter module 408 filters the piston temperature using a lag filter to account for the engine 102 operating in transient conditions. The engine 102 may operate in transient conditions when the engine 102 is cold (e.g., at a temperature that is less than the operating temperature) and/or when the engine 102 is rapidly accelerating or decelerating. When the engine 102 operates in transient conditions, the piston temperature may not change as rapidly as the engine operating conditions change. Thus, the lag filter may be used to account for differences between a change rate of the piston temperature and change rate(s) of the engine operating conditions. The filtered piston temperature may be referred to as a transient temperature.

The temperature filter module 408 may filter the piston temperature using a first order lag filter. For example, the temperature filter module 408 may determine the filtered piston temperature (Tf)pres in a present iteration using the following equation:

$$(T_f)_{pres} = (T_f)_{prev} + k^*[(T_{ss})_{pres} - (T_f)_{prev}] \quad (1)$$

where $(T_f)_{prev}$ is a filtered temperature determined in a previous iteration, k is a constant, and $(T_{ss})_{pres}$ is the steady-state temperature determined in the present iteration. The constant k may be a predetermined value between zero and one, inclusive.

The lag filter may be developed through modeling, testing, and/or calibration. The lag filter may be adjusted based on operating conditions of the engine system 100. For example, the constant k may be adjusted based on the engine speed and/or an iteration loop rate of the ECM 114. In various implementations, the constant k is directly proportional to the engine speed and the iteration loop rate of the ECM 114. The temperature filter module 408 outputs the piston temperature as filtered.

The piston temperature deviation module 410 determines a piston temperature deviation, PTD using the following equation:

$$PTD = (T_{ss})_{pres} - (T_f)_{pres} \quad (2)$$

Where: $(T_f)_{pres}$ is the filtered piston temperature output from the temperature filter module 408 and $(T_{ss})_{pres}$ is the steady-state piston temperature from the temperature estimation module 406.

The fuel control module 414 may then interpolate between values in the first and second lookup tables described above to output a signal to control injection timing, injection pressure, injection location, and/or a number of injections per engine cycle based on the piston temperature deviation. The fuel control module 414 may retard the injection timing, adjust the injection pressure, adjust the injection location, and/or command multiple injections per engine cycle based on the piston temperature deviation. The fuel control module 414 may adjust the injection location by switching from injecting fuel via port injection and direct injection to injecting fuel via port injection only. The fuel control module 414 may stop retarding the injection timing, inject fuel via direct injection, and/or command a single injection per engine cycle based on the piston temperature deviation.

Alternatively, other modules of the engine controller may output different engine control parameters without limitation in a similar manner by interpolating between corresponding first and second tables using the piston temperature deviation. The present invention is understood to not be limited to any particular engine operating parameter. Further, the interpolation is not limited to any particular method, for example, the interpolation may be linear or non-linear.

The fuel control module 414 outputs a desired pulse width. The fuel control module 414 may determine a desired pulse width based on a driver torque request, which may be determined based on the driver input. When the fuel control module 414 commands multiple injections per engine cycle, the fuel control module 414 may divide the desired pulse width by the number of injections to obtain a pulse width per injection.

The fuel control module 414 also outputs a desired crank angle, which is a crank angle corresponding to a time when a start of injection is desired. The fuel control module 414 may adjust the desired crank angle to inject fuel into the cylinder 118 when the piston 128 is completing an intake stroke. Thus, the desired crank angle may be specified in number of degrees before TDC. When the fuel control module 414 retards the injection timing, the fuel control module 414 may decrease the desired crank angle to delay the start of injection.

The throttle control module 412 instructs the throttle actuator module 116 to regulate the throttle valve 112 based on the desired throttle area. The fuel control module 414 instructs the fuel actuator module 124 to regulate the fuel injector 126 based on the desired pulse width and the desired crank angle. The spark control module 416 instructs the spark actuator module 130 to regulate the spark plug 132 based on the desired spark timing.

Figure 5:
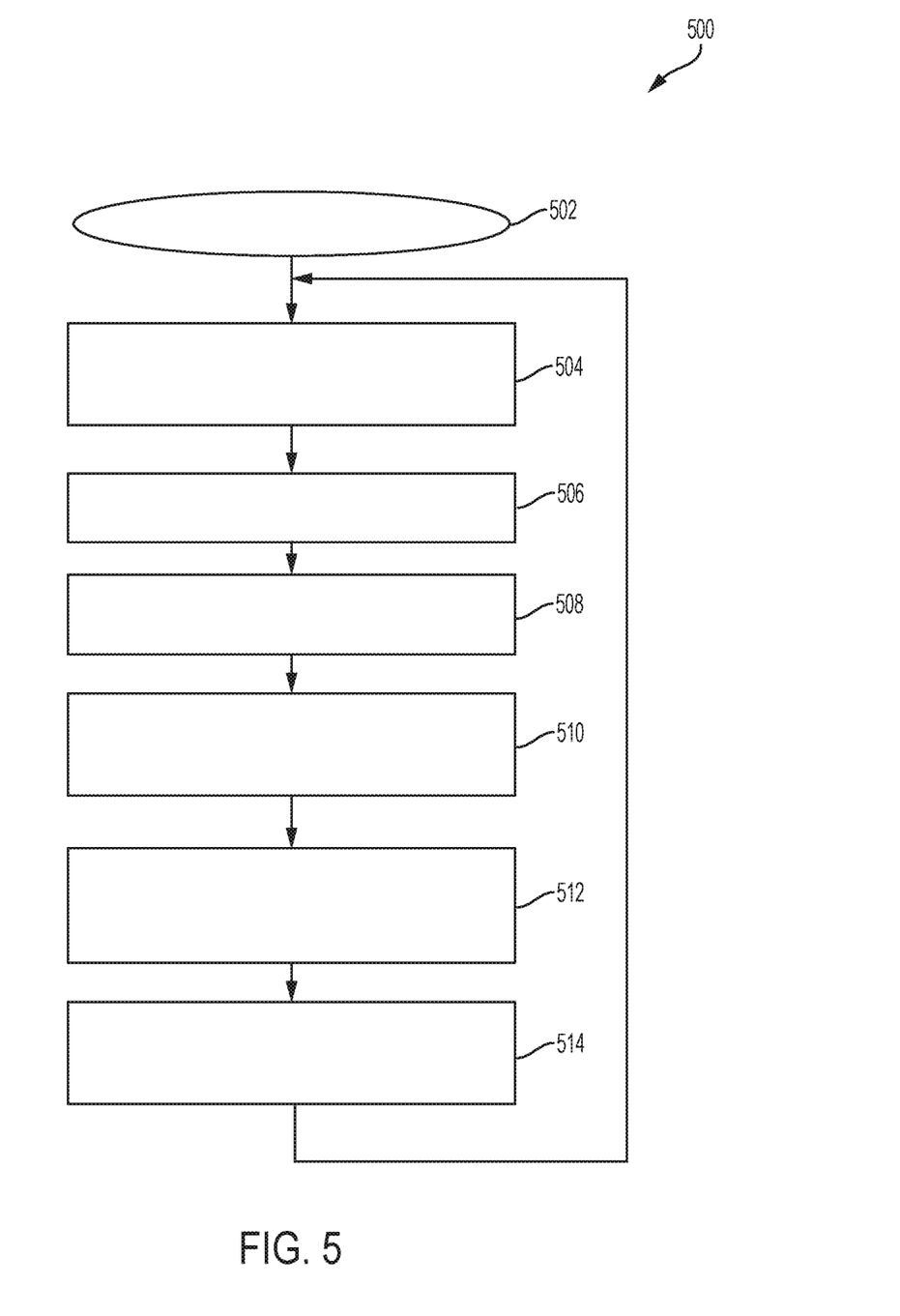
FIG. 5 is a flowchart illustrating an engine control method according to an exemplary embodiment of the present invention.

Referring now to FIG. 5, a method for adjusting an engine control parameter based on piston temperature deviation is illustrated by flowchart 500 which begins at step 502. At step 504, the method estimates the piston temperature based on engine operating conditions. The engine operating conditions may include engine speed, engine load, intake air temperature, engine coolant temperature, air/fuel ratio, spark timing and the like. The method may estimate the piston temperature based on a predetermined relationship between the engine operating conditions and the piston temperature. The predetermined relationship may be embodied in a mathematical model and/or a lookup table. The predetermined relationship may be empirically developed when an engine is operating in steady-state conditions, thereby providing an estimate for "steady-state" piston temperature.

At 506, the method adjusts a lag filter based on an iteration loop rate and/or engine speed. The lag filter may be a first order filter such as the first order filter represented by equation (1) discussed above. The method may adjust the constant k based on the iteration loop rate and/or the engine speed. For example, the method may increase the constant k when the iteration loop rate increases and/or when the engine speed increases. At 508, the method filters the piston temperature using the lag filter.

At 510, the method estimates a piston temperature deviation as explained above in accordance with equation (2). In step 512, the method determines an engine control parameter by interpolating between a first engine control parameter from the first lookup table and a second engine control parameter output from the second lookup table.

At 514, the method adjusts engine control parameters. For example, the method may retard injection timing, adjust injection pressure, adjust injection location, and/or command multiple injections per engine cycle. The method may adjust the injection location by switching from injecting fuel via port injection and direct injection to injecting fuel via port injection only. The method may stop retarding the injection timing, inject fuel via direct injection and/or command a single injection per engine cycle when the piston temperature is greater than the temperature threshold. Again, the present invention is not limited to any particular engine control parameter.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
    a piston temperature estimation module that estimates a piston temperature based on engine operating conditions;
    a piston temperature deviation estimation module that estimates a deviation of the estimated piston temperature from a steady-state piston temperature; and
    an engine control module that determines an engine control parameter based upon the estimated piston temperature deviation.

2. The system of claim 1, wherein the engine control module interpolates between a first value from a first look up table corresponding to a first predetermined piston temperature and a second value from a second look up table corresponding to a second predetermined piston temperature to determine the engine control parameter.

3. The system of claim 2, wherein the engine control module determines the engine control parameter using a linear interpolation method.

4. The system of claim 2, wherein the engine control module the engine control parameter using a non-linear interpolation method.

5. The system of claim 4, wherein the lag filter is a first order lag filter.

6. The system of claim 5, wherein the temperature filter module adjusts the lag filter based on one of an engine speed and an iteration loop rate.

7. The system of claim 1, wherein the engine control module comprises a fuel control module and the engine control parameter comprises a fuel control signal.

8. The system of claim 7, wherein the fuel control signal comprises one of a start of injection signal, an injection pressure, an injection location, a pulse width per injection, and a number of injections per combustion cycle.

9. The system of claim 1, wherein the engine control module comprises a spark controller and wherein the engine control parameter comprises a spark control signal.

10. The system of claim 1, further comprising a temperature filter module that filters the piston temperature using a lag filter and wherein the piston temperature deviation estimation module estimates a deviation of the estimated piston temperature based upon the filtered piston temperature.

11. A method comprising:
estimating a piston temperature based on engine operating conditions;
estimating a piston temperature deviation that estimates a deviation of the estimated piston temperature from a corresponding steady-state piston temperature; and
determining an engine control parameter based upon the estimated piston temperature deviation.

12. The method of claim 11, wherein determining the engine control parameter comprises interpolating between a first value from a first look up table corresponding to a first predetermined piston temperature and a second value from a second look up table of engine control parameters corresponding to a second predetermined piston temperature.

13. The method of claim 12, wherein interpolating the engine control parameter comprises linear interpolation.

14. The method of claim 12, wherein interpolating the engine control parameter comprises non-linear interpolation.

15. The method of claim 11, wherein the engine control parameter comprises a fuel control signal.

16. The method of claim 15, wherein the fuel control signal comprises one of a start of injection signal, an injection pressure, an injection location, a pulse width per injection, and number of injections per combustion cycle.

17. The method of claim 11, wherein the engine control parameter comprises a spark control signal.

18. The method of claim 11, further comprising filtering the piston temperature using a lag filter and estimating a deviation of the estimated piston temperature based upon the filtered piston temperature.

19. The system of claim 18, wherein the lag filter is a first order lag filter.

20. The system of claim 19, wherein adjusting the lag filter is based on one of an engine speed and an iteration loop rate.

* * * * *